AUTOMATIC SLACK ADJUSTER FOR VEHICLE BRAKES

Original Filed Feb. 16, 1965 4 Sheets-Sheet 1

INVENTORS

NILS BORJE LENNART SANDER,
STEN-ERIC SVENSSON

BY Watson, Cole, Grindle + Watson

ATTORNEYS

AUTOMATIC SLACK ADJUSTER FOR VEHICLE BRAKES

Original Filed Feb. 16, 1965 4 Sheets-Sheet 3

INVENTORS

NILS BORJE LENNART SANDER,
STEN-ERIC SVENSSON

BY Wilson, Ole, Hindle & Nelson

ATTORNEYS

AUTOMATIC SLACK ADJUSTER FOR VEHICLE BRAKES

Original Filed Feb. 16, 1965 4 Sheets-Sheet 3

INVENTORS

NILS BORJE LENNART SANDER,
STEN-ERIC SVENSSON

BY
Watson, Cole, Grindle & Watson
ATTORNEYS

AUTOMATIC SLACK ADJUSTER FOR VEHICLE BRAKES

Original Filed Feb. 16, 1965 4 Sheets-Sheet 4

Inventors:
Nils B. L. Sander
Sten-Eric Svensson
By Watson, Cole, Grindle & Watson
Attorneys United States Patent Office Re. 26,965
Reissued Oct. 13, 1970

26,965
AUTOMATIC SLACK ADJUSTER FOR VEHICLE BRAKES

Nils Borje Lennart Sander and Sten-Eric Svensson, Malmo, Sweden, assignors to Svenska Aktiebolaget Bromsregulator, Malmo, Sweden Original No. 3,351,163, dated Nov. 7, 1967, Ser. No. 432,965, Feb. 16, 1965. Application for reissue Oct. 14, 1969, Ser. No. 868,251
Claims priority, application Sweden, Feb. 27, 1964, 2,393/64
Int. Cl. F16d *65/56*
U.S. Cl. 188—196 24 Claims

Figure 1:
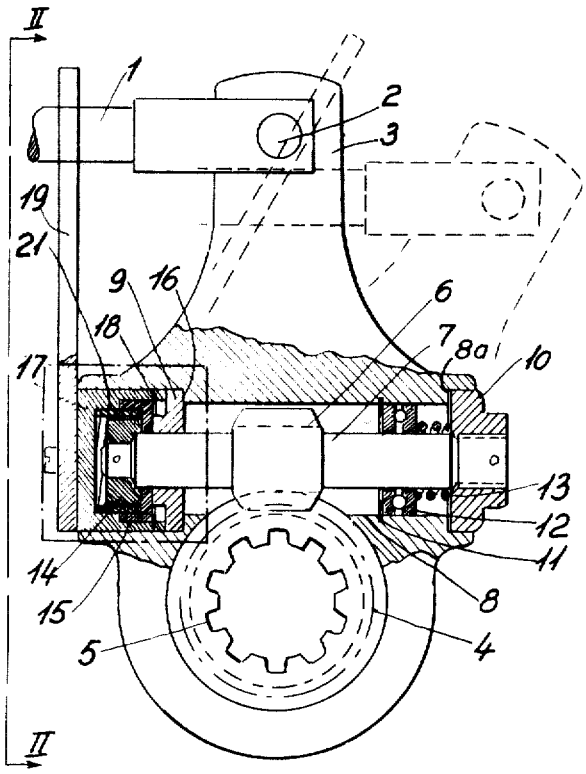

Matter enclosed in heavy brackets [ ] appears in the original patent but forms no part of this reissue specification; matter printed in italics indicates the additions made by reissue.

This invention relates to an automatic slack adjuster for a vehicle brake system, and particularly to adjusters for air or vacuum operated brakes on automobiles, especially heavy automobiles such as buses or trucks.

The type of braking system to which the invention is applicable is that commonly used in motor vehicles of the kind referred to, viz. the type comprising a rotatably mounted braking lever and a braking shaft operable thereby for rotation about the axis of rotation of said lever. Ordinarily, the said braking shaft carries a cam which by rotation of the braking shaft urges the braking shoes against the inner cylindrical face of a braking drum against the action of a return spring.

In order to adjust the slack of braking systems of the kind described, it is known to construct the connection between the braking lever and the braking shaft in the form of a worm gear transmission, the worm gear of which is mounted in the braking lever to form an angularly adjustable connection between the braking lever and the braking shaft, and the worm meshing with the worm gear also being mounted in the lever so that by turning this worm, the worm gear may be angularly adjusted to adjust the slack.

Various proposals have also been made for constructing a braking system of the type described with means for automatically adjusting the slack by causing the said worm to be rotated when the slack has become excessive.

In these known slack adjusters, adjustment is effected whenever the braking stroke exceeds a predetermined limit, this being taken as an indication that the slack has become excessive.

However, the fact is that in the operation of braking systems of the type described, the total angular movement of the braking lever during braking and brake release is composed of an angular movement, during which the braking shoes are not in contact with the braking drum, and another angular movement during which such contact occurs. The first angular movement depends on the play between the braking shoes and the braking drum in the completely released state of the brake, while the other angular movement depends on the braking force and the elasticity of the braking system.

Therefore, if the total angular movement becomes excessive, the reason for this may be either that the play between the braking shoes and the braking drum in the completely released state of the brake is excessive, or that the elastic deformation in a braking operation has been excessive due to an excessive braking force. It is therefore a disadavntage of the known adjusters referred to that adjustment may take place as a consequence of a single very hard application of the brakes, though no adjustment is really required so that as a result, the slack will become too small. The danger of such false adjustment is particularly great where a hand brake is connected to a power operated brake system.

Moreover, many of the known slack adjusters suffer from the drawback that they are very delicate and likely to be influenced so as to cause false adjustment of the slack when exposed to impacts from stones thrown against them during the operation of the vehicle.

It is an object of the invention to construct an automatic slack adjuster for a vehicle brake system of the type referred to which operates in response to the real slack, i.e. the play between the braking shoes and the braking drum in the completely released state of the brake so that it becomes possible to effect adjustment in such a manner that the vehicle will always have a constant braking capacity and the braking shoes will always engage the braking drums simultaneously on both sides of the vehicle.

Another object of the invention is to construct an automatic slack adjuster of the type referred to in such a manner that false adjustment may not be caused by the occurrence of an excessive braking force, and particularly by application of the hand brake combined with a power operated braking system.

A further object of the invention is to provide a slack adjuster of the type referred to which is less subject to influence by the impact from stones than previously known slack adjusters of the type referred to.

A still further object is to provide adjusting means which are protected from unintended or erroneous manual adjustment of the angle through which the lever arm is to be moved prior to an automatic adjustment movement.

A still further object of the invention is to provide automatic adjustment means which are not influenced by dirt, wear or corrosion.

With these and other objects in view, which will be apparent to those skilled in the art, the invention consists in the arrangement and combinations set forth in the appended claims.

Figure 2:
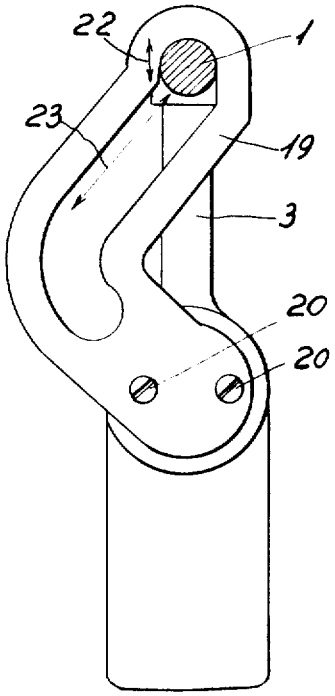
Figure 3:
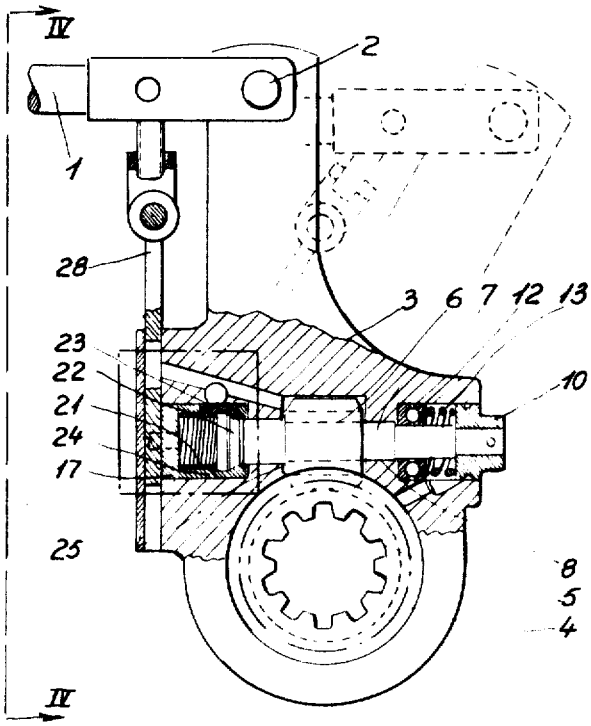
Figure 4:
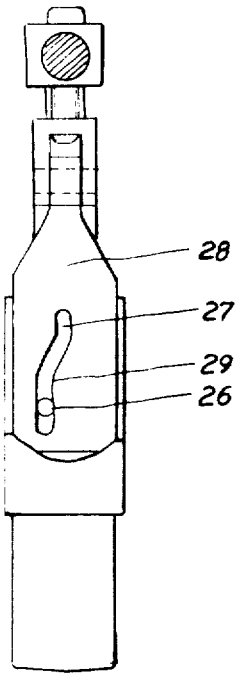
Figure 5:
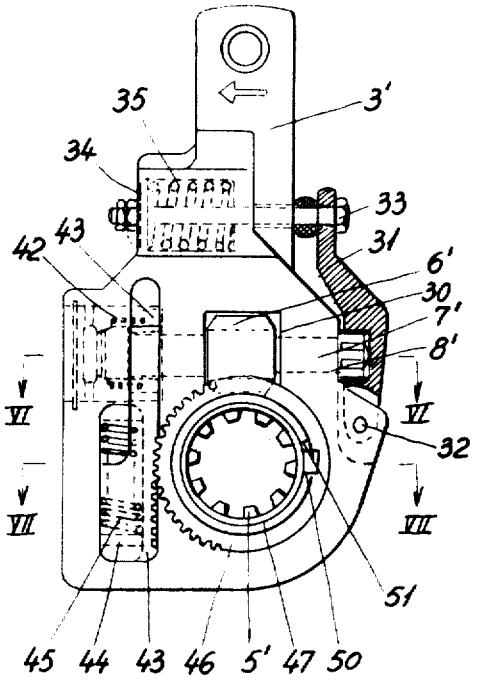
Figure 7:
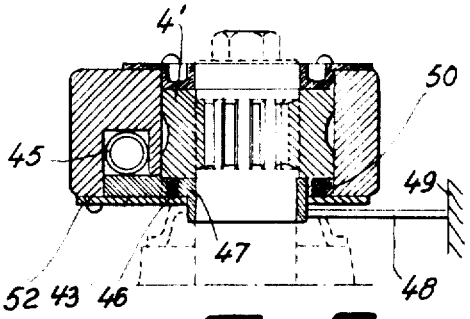
Figure 8:
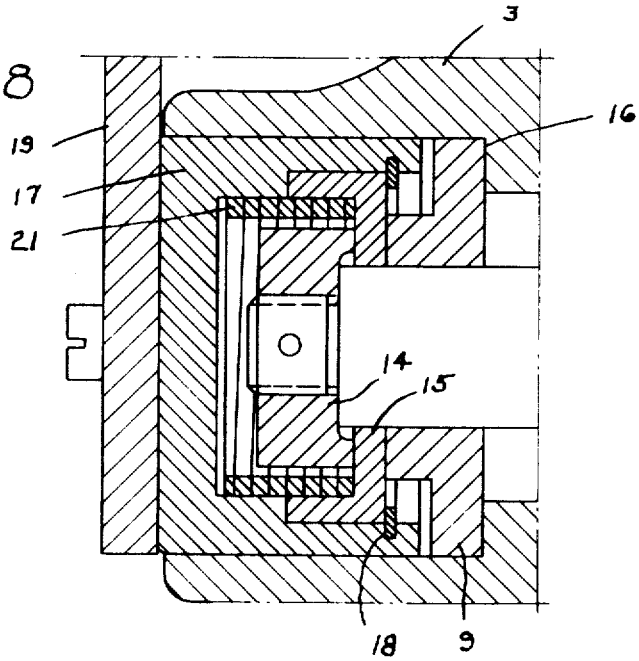
Figure 9:
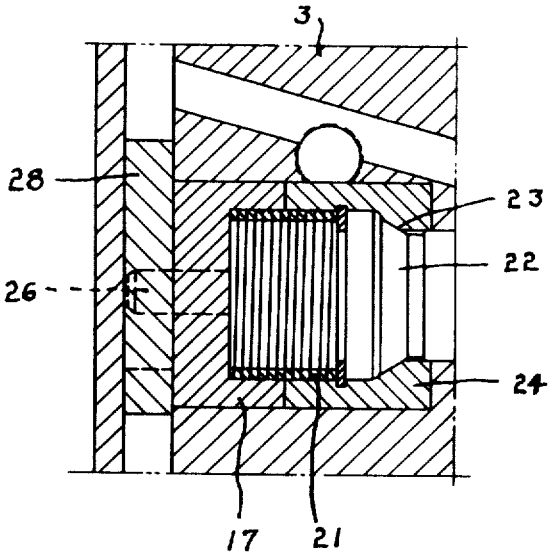
Figure 10:
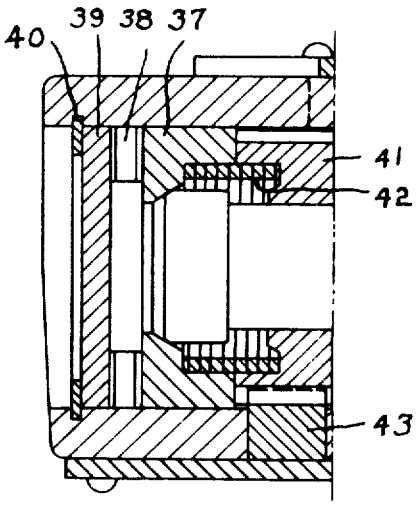

The invention will now be described in further detail with reference to the accompanying drawings in which FIG. 1 shows one form of an automatic slack adjuster according to the invention in side view and partly in section, FIG. 2 the slack adjuster of FIG. 1 as viewed in the direction of the arrows II—II in FIG. 1, FIG. 3 a slack adjuster according to a second embodiment of the invention, in side view and partly in section, FIG. 4 the slack adjuster of FIG. 3, as viewed in the direction of the arrows IV—IV in FIG. 3, with parts broken away, FIG. 5 a slack adjuster according to a third embodiment of the invention, in side view, with parts in section, FIG. 6 a section through the slack adjuster of FIG. 5 along the line VI—VI in FIG. 5, FIG. 7 a section through the slack adjuster of FIG. 5 along the line VII—VII in FIG. 5, FIG. 8 is a substantially enlarged view of the portions enclosed within the broken-line rectangle in FIG. 1, FIG. 9 is an enlarged view of the portion of FIG. 3 which is enclosed within the broken-line rectangle of FIG. 3, and FIG. 10 is a substantially, enlarged view of the left-hand end portion of the structure shown in FIG. 6.

In FIGS. 1, and 2, 1 is the piston rod of a braking piston, not shown. The piston rod 1 is pivotally connected by means of a bolt 2 with a braking lever 3, which is rotatably mounted on a worm gear 4. The said worm gear 4 is connected by means of splines 5 with the shaft of a braking cam, not shown, which is adapted in conventional manner to actuate the brake shoes in the braking drum of a vehicle. The worm gear 4 meshes with a worm 6 rigidly mounted on a shaft 7 which is received in a bore 8 in the braking lever 3 and is supported for movement tangentially to the worm gear 4 by two discs 9 and 10. Adjacent its right-hand end, the shaft 7 is guided for such movement by a split ring 11, a ball bearing 12, a spring 13 and the disc 10 which is fixedly mounted on the shaft 7. Near its other end, the shaft 7 is guided by a disc 14 fixed on the shaft, a friction element 15 fixed to the shaft 7 and the disc 9, the latter abutting a shoulder 16 in the bore 8.

A sleeve-like cover 17 is held in the bore 8 by means of a split ring 18. A cam member 19 is attached to the cover 17 by means of screws 20. The friction element 15 and the cover 17 are constructed with co-axial cylindrical bores of equal diameter and the inner walls of these bore are frictionally, engaged by a one-way coupling element in the form of a helical spring 21. The cam member 19 is constructed with a cam slot having an outer portion 22 extending radially with respect to the axis of the shaft 7, and an inner portion 23 extending at an inclination to the portion 22.

The described slack adjuster operates as follows:

During braking, the piston rod 1 moves to the right in FIG. 1 and rotates the braking lever 3 about the worm gear 4 to the position indicated in dotted lines. Thereby the piston rod 1 will move inwardly from the radial portion 22 of the cam slot and along the inclined slot portion 23. It will thus rotate the cam member 19 clockwise as seen in FIG. 2. The cover 17 rotates with the cam member 19 but the spring 21 is wound in such a direction that it is disengaged from and thus will not transmit rotary movement in this direction from the cover 17 to the friction element 15. During the whole of the braking stroke of the piston rod 1, the worm shaft 7 and worm gear 4 remain in a fixed angular position about the axis of the worm gear to transmit rotary movement through the worm gear 4 to a braking cam (not shown) having its shaft splined in said worm gear. The shaft 7 is maintained stationary in the circumferential direction, but is urged in the axial direction towards the left in FIG. 1 under the influence of the braking force owing to the axial reaction force thereby created between the worm gear 4 and the worm 6. As long as the braking force is below a certain limit, the spring 13 urging the shaft 7 towards the right will not yield, but when the braking force overcomes the force of the spring 13, the shaft 7 and its disc 10 will be displaced axially a small distance to the left until the disc 10 engages a shoulder 8a in the bore 8. At the same time, such axial displacement of the shaft will disengage the friction element 15 from the disc 14 to permit rotation of the shaft 7 and worm 6.

During the brake releasing stroke, the piston rod 1 is moved to the left in FIG. 1 from the position indicated in dotted lines. The piston rod will therefore rotate the cam member 19 in a counterclockwise direction, as seen in FIG. 2. This rotational movement is transferred through the spring 21 to the friction element 15, but the latter cannot transfer any rotational movement to the disc 14 and thereby to the shaft 7, until the braking force transmitted through the worm shaft 7 to the worm gear 4 has decreased to such a value that the spring 13 has expanded to establish contact between the friction element 15 and the disc 14. If this occurs so early that the piston rod 1 is still present in the radially declined portion 23 of the slot of the cam member 19, the last part of the rotational movement of the cam member 19 will be transmitted to the shaft 7. The worm 6 and the worm gear 4 are so constructed that the worm gear 4 will be rotated clockwise relative to the braking lever 3. Thus there occurs a rotary adjustment of the braking cam in the slack decreasing direction at the brake shoes.

If on the other hand the braking force decreases so late that the expansion of the spring 13 and consequent engagement of the clutch elements 14 and 15 is deferred until after the piston rod 1 has reached the radial portion 22 of the slot of the cam member 19, the shaft 7 will not be rotated because movement of the piston rod 1 in the portion 22 does not produce rotational movement of the cam member 19.

The position of the braking cam relative to the braking lever 3 may be manually adjusted by rotation of the disc 10. After the slack adjuster has been mounted, the slack between the brake shoes and the brake drum is adjusted somewhat greater than normal. During the first braking operation, the piston stroke will therefore be too long and during the brake releasing stroke, the braking force in the piston rod 1 will therefore decrease before the piston rod has reached the portion 22 of the cam member 19. The shaft 7 will therefore be coupled to the cam member 19 so as to be rotated in the slack decreasing direction. After a few braking operations, the slack has been reduced so much that the braking force decreases and the element 15 is coupled to the disc 14 in the same moment as the piston rod 1 reaches the portion 22 of the slot of the cam member.

The slack will now remain constant, seeing that a small increase of the slack—e.g. as a consequence of wear—will result in after-adjustment in the next braking operation.

Ordinarily, a slack adjuster is mounted in conjunction with each wheel of the vehicle, and it is of course essential that the slack automatically adjusted by means of the slack adjusters should be the same at all of the wheels.

The embodiment illustrated in FIGS. 3 and 4 differs from that of FIGS. 1 and 2 in that the shaft 7 is directly radially guided in the bore 8. Moreover, the movement of the shaft 7 in the axial direction is limited partly by a conical surface 22 of the shaft which cooperates with a conical inner fixed clutch surface 23 of a sleeve 24 mounted in the bore 8, partly by engagement of the worm 6 with a radial surface 25 in the bore 8. The spring 13 tends to move the shaft 7 to the right in FIG. 3 so as to frictionally engage the conical surfaces 22 and 23 with one another. The locking spring 21 establishes a one-way coupling between the sleeve 23 and the cover 17 in the same manner as in the embodiment previously described. The cover 17 is provided with an eccentric pin 26 which is guided in a slot 27 of a slide member 28 which is linked to the piston rod 1.

The embodiment illustrated in FIGS. 3 and 4 operates as follows:

During braking the piston rod 1 is moved to the right in FIG. 3 so that the braking lever is rotated clockwise to the position indicated in dotted lines. At the same time the slide member 28 is displaced downwards, and the pin 26 is thereby moved to the right from its position as shown in FIG. 4. Thereby the cover 17 is caused to rotate but the rotation is not transferred to the sleeve 24, because the spring 21 is coiled in such a direction that it cannot transfer torques during application of the brake. When the braking force becomes so great that the spring 13 is compressed under the influence of the reaction force between the worm gear 4 and the worm 6 and the shaft 7 is displaced to the left, the locking engagement between the conical surfaces 22 and 23 is interrupted. This condition also prevails (in other words, the surfaces 22 and 23 are disengaged) during the first part of the subsequent brake releasing stroke. Only when the braking force has decreased to such an extent that the shaft 7 is again locked to the sleeve 24, may adjustment take place during release of the brake. If the pin 26 is present above the point marked by the reference character 29 in the slot 27 during release of the brake when the locking engagement takes place, an adjustment will be effected. When the pin 26 has arrived below the point 29, FIG. 4, in the slot 27, the cover 17 will not be rotated. An advantage of the arrangement of FIGS. 3 and 4 is that the slot 27 is protected against outer influences and is accessible for efficient lubrication.

Figure 6:
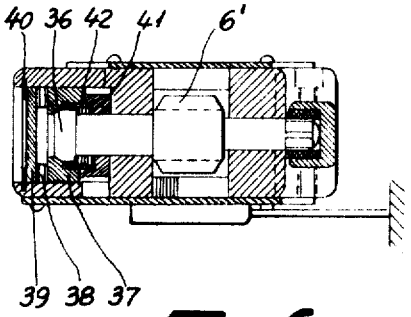

The embodiment illustrated in FIGS. 5–7 again comprises the braking lever 3, the worm gear 4' (FIG. 7), the splined connection 5' with a braking shaft not shown, the worm 6' on the shaft 7' and the bore 8' forming a radial guide for the shaft 7'.

Axial movement of the worm 6' and the shaft 7' in a direction to the right is limited by an abutment surface 30 extending perpendicularly to the shaft 7'. A lever 31 is mounted for rotation about a pin 32. At the end of the lever 31 remote from the pin 32, a bolt 33 extends through the hole of the lever 31 and a hole of the braking lever 3'. A washer 34 and a compression spring 35 are mounted on said bolt in such a manner that the compression spring 35 urges the elever 31 in the anti-clockwise direction. At the end of the shaft located to the left in FIGS. 5 and 6, the shaft is constructed with a coupling part 36 having a conical coupling face for engagement with a corresponding conical bore of a coupling sleeve 37. The said coupling sleeve is axially guided towards the left by a bearing 38 which is in turn guided by a disc 39 and a locking ring 40, while the coupling sleeve is guided towards the right by a gear wheel 41 which is in turn guided by an abutment surface of the braking lever 3'. The gear wheel 41 and the coupling sleeve 37 are constructed with cylindrical bores of equal diameter and a coupling spring 42 is arranged within said bores in engagement with the walls thereof. The coiling direction of the spring 42 is such that the gear wheel 41 may transfer rotational movement to the coupling sleeve 37 only in the direction corresponding to reduction of the slack of the brake. The gear wheel 41 meshes with a rack 43, the lower end of which forms an abutment 44 for the lower end of a spring 45 the upper end of which engages an abutment surface of the braking lever 3.

The rack 43 is also constructed with another row of teeth meshing with teeth on pant of the periphery of a ring 46 mounted on the braking lever 3 coaxially with the gear wheel 4. A control sleeve 47 is mounted in the said ring 46 which control sleeve is rigidly connected through a stationary arm 48 with an element 49 which is stationary relative to the wheel axis of the vehicle. The control sleeve 47 and the ring 46 are connected with each other in the circumferential direction through a dog element 50 which is rigidly mounted in the ring 46 and engages in a recess 51 of the control sleeve 47 having a greater width in the circumferential direction than the dog element 50. FIGS. 6 and 7 show a cover 52 which for clearness is not shown in FIG. 5. The slack adjuster described with reference to FIGS. 5–7 operates as follows:

During braking, the braking lever is rotated in the direction indicated by the arrow. The sleeve 47 is stationary and after the clearance between the dog element 50 and the end wall of the recess 51 frontmost in the anti-clockwise direction has been exhaisted, the toothed ring 46 also becomes stationary. Doring forther rotation of the braking lever 3, the rack 43, by its engagement with the now stationary toothed ring 46 is influenced by the rotational motion of the braking lever so as to be displaced in a direction such that the spring 45 is compressed. During displacement of the rack 43, the gear wheel 41 is rotated, but since the spring 42 is so coiled as not to be capable of transmitting torque in this direction, the coupling sleeve 37 remains stationary.

Gradually as the braking force increases, the engagement pressure between the worm gear 4' and the worm 6' increases. When the compression spring 35 is no longer capable of maintaining the shaft 7' in the axial position illustrated, the shaft 7' is displaced to the right until the worm 6' engages the vertical abutment surface 30 of the braking lever. The coupling between the parts 36 and 37 is thereby interrupted.

During the subsequent brake release, the braking lever is rotated in the opposite direction. The braking force decreases, the rack 43 is displaced in a direction such that the spring 45 expands and the gear wheel 41 is caused to rotate in a direction such that this rotational movement can be transmitted to the coupling sleeve 37. However, no transfer of the movement to the shaft 7 may take place until the braking force has decreased to such an extent that the spring 35 has succeeded in displacing the shaft 7 to the left until the coupling between the parts 36 and 37 has been established.

Consequently, an adjustment of the slack by rotation of the worm 6 will only take place if the coupling between the parts 36 and 37 has been established before the rack 43 has been returned to its normal position. The condition to be fulfilled in order that the slack between braking shoes and braking drum may be kept constant—irrespective of resilient movements in the transmission means for the braking force—is that the spring 45 rotates the gear wheel 41 back during the period when the coupling between the parts 36 and 37 is interrupted.

We claim:

1. An automatic slack adjuster for a vehicle brake system of the type comprising a rotatably mounted braking lever and a braking shaft operable thereby for rotation about the axis of rotation of said lever, said slack adjuster comprising a worm gear mounted in said lever for rotation about its said axis of rotation to form an angularly adjustable connection between said braking lever and said braking shaft, a worm shaft mounted in said lever and carrying a worm engaging with said worm gear for the purpose of angularly adjusting same, a one-way coupling mounted in said lever co-axially with said worm shaft, means for rotating said one-way coupling forth and back in response to angular movement of said braking lever in the braking and brake releasing directions beyond a predetermined angular departure from its neutral position, the axis of said worm shaft extending generally tangentially with respect to said worm gear, said worm shaft being axially slidable with respect to said lever, axially engageable clutching means on said one-way coupling and said worm shaft, and biased spring means urging said worm shaft in a direction to engage said clutching means.

2. An automatic slack adjuster as in claim 1 in which said one-way coupling comprises two coupling parts having cylindrical bores of equal diameter facing one another, and a tightly coiled helical spring engaging the cylindrical walls of both bores.

3. An automatic slack adjuster as in claim 1 in which said clutching means is formed by co-operating conical surfaces of said worm shaft and a rotatable member forming part of said one-way coupling.

4. An automatic slack adjuster for a vehicle brake system of the type comprising a rotatably mounted braking lever and a braking shaft operable thereby for rotation about the axis of rotation of said lever, said slack adjuster comprising a worm gear mounted in said lever to form an angularly adjustable connection between said braking lever and said braking shaft, a worm shaft mounted in said lever and carrying a worm engaging with said worm gear for the purpose of angularly adjusting same, a one-way coupling mounted in said lever co-axially with said worm shaft, a driving member mounted for rotation relative to said lever about the axis of rotation thereof, lost motion coupling means between said driving member and a stationary part of the vehicle, and transmission means mounted in said lever for transmitting motion between said driving member and a rotatable member forming part of said one-way coupling, said worm shaft being axially slidable with respect to said lever, axially engageable clutching means on said one-way coupling and said worm shaft, and biased spring means urging said worm shaft, in a direction to engage said clutching means.

5. An automatic slack adjuster as in claim 4 in which said lever is constructed in the form of a housing, said worm, said worm-shaft, said one-way coupling, said worm gear, said driving member and said transmission means being mounted in said housing, and said coupling means extended into said housing.

6. An automatic slack adjuster as in claim 4 in which said transmission means are in the form of a slidable member having rack teeth engaging with teeth of said driving member and said rotatable member forming part of said one-way coupling.

7. An automatic slack adjuster for a vehicle brake system comprising a braking lever mounted for angular movement about an axis, said braking lever being connectable to brake operating means so as to be operable thereby for rotation about the said axis, a worm gear mounted in said lever for angular adjustment about said axis, said worm gear being connectable to brake actuating means in such a manner as to operate same, in response to rotation of said lever about said axis, a worm rotatably mounted in said lever, said worm meshing with said worm gear so as to be capable, when rotated, to adjust the angular position of said worm gear relative to said lever, and thereby to adjust the slack of the brake system, worm driving means movable forth and back in response to angular movement of said lever about said axis beyond a predetermined angular departure from the neutral position of said lever, and coupling means forming a coupling path between said worm driving means and said worm, said coupling means including one-way coupling means active only in the slack decreasing direction of rotation of said worm and means adapted to interrupt said coupling path in response to braking forces exceeding a predetermined value.

*8. A slack adjuster as defined in claim 7, wherein said means, adapted to interrupt the coupling path, comprises a spring that does not yield as long as the braking force is below a predetermined limit.*

*9. A slack adjuster as defined in claim 8, wherein the means, adapted to interrupt the coupling path including said spring, comprises a clutch operable by means of said spring when the braking force exceeds said predetermined limit to permit rotative movement of said braking lever about said axis without rotating said worm.*

*10. A slack adjuster as defined in claim 9, wherein said clutch comprises a friction element rotatable with said worm.*

*11. A slack adjuster as defined in claim 10, wherein said spring is coupled to permit axial displacement of said worm when the braking force exceeds said predetermined limit and said friction element of said clutch is located for disengagement by the axial displacement of the worm.*

*12. A slack adjuster as defined in claim 7, wherein said means, adapted to interrupt the coupling path, comprises a mechanism permitting said worm to rotate after the braking force exceeds a predetermined limit.*

*13. A slack adjuster as defined in claim 7, wherein said worm is mounted on a shaft and said one way coupling means comprises a helical spring about the worm shaft frictionally engaging the shaft to rotate the worm in one direction of movement.*

*14. A slack adjuster as defined in claim 7, wherein said one way coupling means comprises a frictionally engaging element operable during the brake releasing stroke to decrease slack in the braking system.*

*15. A slack adjuster as defined in claim 7, wherein said worm driving means comprises a connecting cam member between said lever and said worm tending to rotate said worm through said one way coupling means.*

*16. A slack adjuster as defined in claim 15, wherein a brake rod is pivotably coupled to said braking lever and said connecting cam is connected to said brake rod for rotating said worm as the brake lever is angularly moved about said axis.*

*17. A slack adjuster as defined in claim 16, wherein said connecting cam comprises a plate having a cam slot therein in which said brake rod rides.*

*18. A slack adjuster as defined in claim 16, wherein the coupling mechanisms driving the worm beyond said predetermined angular departure includes a lost motion mechanism, wherein a portion of said angular movement of the braking lever about said axis does not provide rotational movement of said worm.*

*19. A slack adjuser as defined in claim 18, wherein the lost motion mechanism comprises a portion of the connecting cam mechanism.*

*20. A slack adjuster as defined in claim 7, wherein the mechanism rotating said worm beyond said predetermined angular departure comprises lost motion means whereby rotational movement of the worm is not produced during a predetermined amount of angular adjustment of said lever about said axis.*

*21. An automatic slack adjuster for a vehicle brake system comprising a braking lever mounted for angular movement about an axis, said braking lever being connectable to brake operating means so as to be operable thereby for rotation about said axis, a worm gear mounted in said lever for angular adjustment about said axis, means connecting said worm gear to brake actuating means in such a manner as to operate same in response to rotation of said lever about said axis, a worm rotatably mounted in said lever, said worm meshing with said worm gear so as to be capable, when rotated, to adjust the angular position of said worm gear relative to said lever and thereby to adjust the slack of the brake system, worm driving means movable forth and back in response to angular movement of said lever about said axis, and coupling means forming a coupling path between said worm driving means and said worm, said coupling means including means active in the slack decreasing direction of rotation of said worm and said coupling means including decoupling means adapted to interrupt said coupling path in response to braking forces exceeding a predetermined value established when elastic deformation in the braking system becomes excessive, whereby the slack will not become too small.*

*22. An automatic slack adjuster as defined in claim 21, including a lost motion mechanism effective to cause said worm driving means to move said lever about said axis beyond a predetermined angular departure from the neutral position of said lever.*

*23. An automatic slack adjuster as defined in claim 21, wherein the coupling means active in the slack decreasing direction of rotation of said worm consists of one-way coupling means active only in the slack decreasing direction of rotation of said worm.*

*24. An automatic slack adjuster as defined in claim 21, wherein the decoupling means comprises a surface operable to produce a frictional coupling between said brake operating means and said worm until said braking force value is exceeded.*

References Cited

The following references, cited by the Examiner, are of record in the patented file of this patent or the original patent.

UNITED STATES PATENTS

| | | | |
|---|---|---|---|
| 1,908,435 | 5/1933 | McConkey | 188—79.5 |
| 2,697,497 | 12/1954 | Shively | 188—79.5 X |
| 2,920,724 | 1/1960 | Margetic et al. | 188—79.5 |
| 3,177,983 | 4/1965 | McGregor | 188—79.5 |

DUANE A. REGER, Primary Examiner

U.S. Cl. X.R.

188—79.5